(No Model.)

W. J. McDERMOTT.
BELTING.

No. 264,731. Patented Sept. 19, 1882.

Witnesses:
Jas. E. Hutchinson
J. A. Rutherford

Inventor.
William J. McDermott,
By his Attorney,
James L. Norris.

UNITED STATES PATENT OFFICE.

WILLIAM J. McDERMOTT, OF MEMPHIS, TENNESSEE.

BELTING.

SPECIFICATION forming part of Letters Patent No. 264,731, dated September 19, 1882.

Application filed January 24, 1882. (No model.)

*To all whom it may concern:*

Be it known that I, WILLIAM J. McDERMOTT, a citizen of the United States, residing at Memphis, in the county of Shelby and State of Tennessee, have invented new and useful Improvements in Belting, of which the following is a specification.

The object of my invention is to provide a strong, cheap, and durable belt for driving machinery, and this I accomplish by constructing the belt of alternating layers of cotton webbing, gum or similar adhesive substance, and paper, combined with interposed longitudinal wires or strips of metal, the pulley side of the belt being smoothly finished with a facing of textile fabric, all of which will be more fully hereinafter described in detail.

Figures 1, 2:
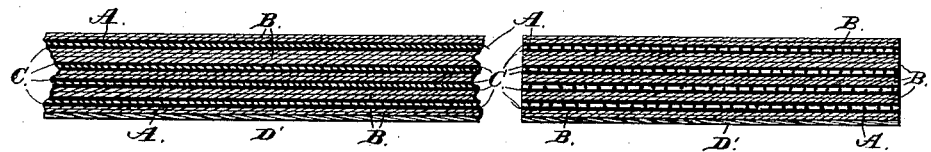

In the accompanying drawings, Figure 1 represents a longitudinal section of a portion of a belt constructed in accordance with my invention; Fig. 2, a transverse sectional view of the same; and Fig. 3, a view similar to Fig. 2, but showing flat strips of metal instead of cylindrical wires interposed between the layers of cotton webbing and paper.

Referring to the drawings, the letter A indicates the layers of wires, which are arranged longitudinally with the belt, said wires being made of cylindrical shape and annealed, so that they can conform to the periphery of the pulley.

The letter B indicates the layers of paper, which are in immediate contact with the layers C, of some suitable gum or adhesive substance, so that when the whole is subjected to pressure—as, for example, by passing the same between rollers—a practically solid belt will be formed.

The letter D indicates layers of cotton webbing, which are caused to adhere to the layer or layers of paper contiguous to them by means of the gum or adhesive substance C, which latter will penetrate the fibers of the webbing, and in this manner all the layers are substantially and firmly united together. The disposition and number of layers of cotton webbing, paper, and interposed longitudinal wires or metal strips can be varied; but the wires are in all instances interposed between the layers of paper and the layers of cotton fabric.

Figure 3:
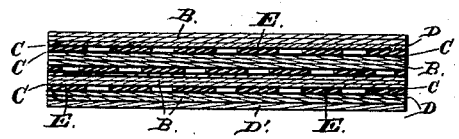

Instead of using cylindrical wires, I may employ longitudinal strips of flat metal, as indicated by the letter E in Fig. 3; but otherwise the construction of the belt is the same as in the other figures.

A belt constructed in accordance with my invention will be found very tough and serviceable, and at the same time will be sufficiently flexible to meet every requirement of belting for driving machinery.

I do not wish to be understood as broadly claiming a belt composed of layers of textile fabric and paper; nor as broadly claiming longitudinal wires inclosed between two plies of woven fabric, such fabric being covered with leather, and the whole united by transverse rivets; but my claim is restricted to the combination of a series of layers of cotton webbing, paper, gum, or other adhesive substance, and longitudinal wires or strips of metal interposed between the cotton webbing and the paper, and the outer pulley-surface of the belt being finished with a facing of textile material.

I therefore claim as my invention and desire to secure by Letters Patent—

A belt for driving machinery, combining in its structure a series of alternating layers of cotton webbing, paper, gum or other adhesive substance and longitudinal strips of metal, the outer pulley-face of the belt being finished with textile fabric, and the strips of metal being interposed between the layers of cotton webbing and paper, substantially as shown and described.

In testimony whereof I have hereunto set my hand in the presence of two subscribing witnesses.

WILLIAM J. McDERMOTT.

Witnesses:
   J. M. COLEMAN,
   D. W. DINON.